United States Patent
Ward (10) Patent No.: US 11,948,346 B1
(45) Date of Patent: Apr. 2, 2024

(54) MACHINE LEARNING MODEL INFERENCE USING USER-CREATED MACHINE LEARNING MODELS WHILE MAINTAINING USER PRIVACY

(71) Applicant: The ADT Security Corporation, Boca Raton, FL (US)

(72) Inventor: Shy Ward, Flower Mound, TX (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/339,648

(22) Filed: Jun. 22, 2023

(51) Int. Cl.
   *G06V 10/94* (2022.01)
   *G06V 10/774* (2022.01)
   *G06V 10/776* (2022.01)
   *G06V 20/40* (2022.01)

(52) U.S. Cl.
   CPC .......... *G06V 10/774* (2022.01); *G06V 10/776* (2022.01); *G06V 10/95* (2022.01); *G06V 20/40* (2022.01); *G06V 2201/10* (2022.01)

(58) Field of Classification Search
   CPC .... G06V 10/774; G06V 10/776; G06V 10/95; G06V 20/40; G06V 2201/10
   See application file for complete search history.

(56) References Cited

U.S. PATENT DOCUMENTS

| | | | |
|---|---|---|---|
| 10,192,172 B2 | 1/2019 | Chan et al. | |
| 10,922,628 B2 | 2/2021 | Yoo et al. | |
| 11,070,389 B2 | 7/2021 | Schuster et al. | |
| 11,526,754 B2 | 12/2022 | Odibat et al. | |
| 2019/0130261 A1* | 5/2019 | Rallapalli | G06N 3/042 |
| 2020/0151613 A1 | 5/2020 | Yoo et al. | |
| 2021/0081720 A1 | 3/2021 | Polleri et al. | |
| 2021/0142107 A1 | 5/2021 | Vineet | |
| 2022/0051043 A1* | 2/2022 | Lee | G06V 30/41 |
| 2022/0327365 A1 | 10/2022 | Kubota | |

FOREIGN PATENT DOCUMENTS

| | | |
|---|---|---|
| EP | 4141746 A1 | 3/2023 |
| WO | 2021051230 A1 | 3/2021 |
| WO | 2022034475 A1 | 2/2022 |

OTHER PUBLICATIONS

Jaimes, Alejandro, and Shih-Fu Chang. "Integrating multiple classifiers in visual object detectors learned from user input." In Invited paper, session on Image and Video Databases, 4th Asian Conference on Computer Vision (ACCV 2000), Taipei, Taiwan. 2000. (Year: 2000).*

* cited by examiner

*Primary Examiner* — Carol Wang
(74) *Attorney, Agent, or Firm* — Christopher & Weisberg, P.A.

(57) ABSTRACT

A server system is described. The server system includes at least one processor and at least one memory storing a plurality of instructions that, when executed by the at least one processor, causes the at least one processor to receive a plurality of machine learning (ML) models and ML model data from the plurality of mobile computing devices, where the ML model data includes metadata, and the ML model data excludes media. At least one group of the plurality of ML models is selected based on the metadata, each ML model of the at least one group tested, and a plurality of metrics is determined based on the ML models that were tested. Further, a set of ML models of the ML models that were tested is selected, and at least two ML models of the set of ML models are combined based on at least one parameter.

18 Claims, 8 Drawing Sheets

MACHINE LEARNING MODEL INFERENCE USING USER-CREATED MACHINE LEARNING MODELS WHILE MAINTAINING USER PRIVACY

TECHNICAL FIELD

The present technology is generally related to making machine learning model inferences using machine learning models.

BACKGROUND

Machine learning (ML) is a category of artificial intelligence (AI) where ML models may be created. To create an ML model, an ML algorithm may be fed with a set of labeled training data. The accuracy of the resulting ML model often depends on the quality and amount of training data, the algorithm used to train the model, and other factors.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

One or more embodiments of the present disclosure are related to machine learning model inference(s) using user-created machine learning models while maintaining user privacy.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a," "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate, and modifications and variations are possible for achieving the electrical and data communication.

In some embodiments described herein, the term "coupled," "connected," and the like, may be used herein to indicate a connection, although not necessarily directly, and may include wired and/or wireless connections.

Figure 1:
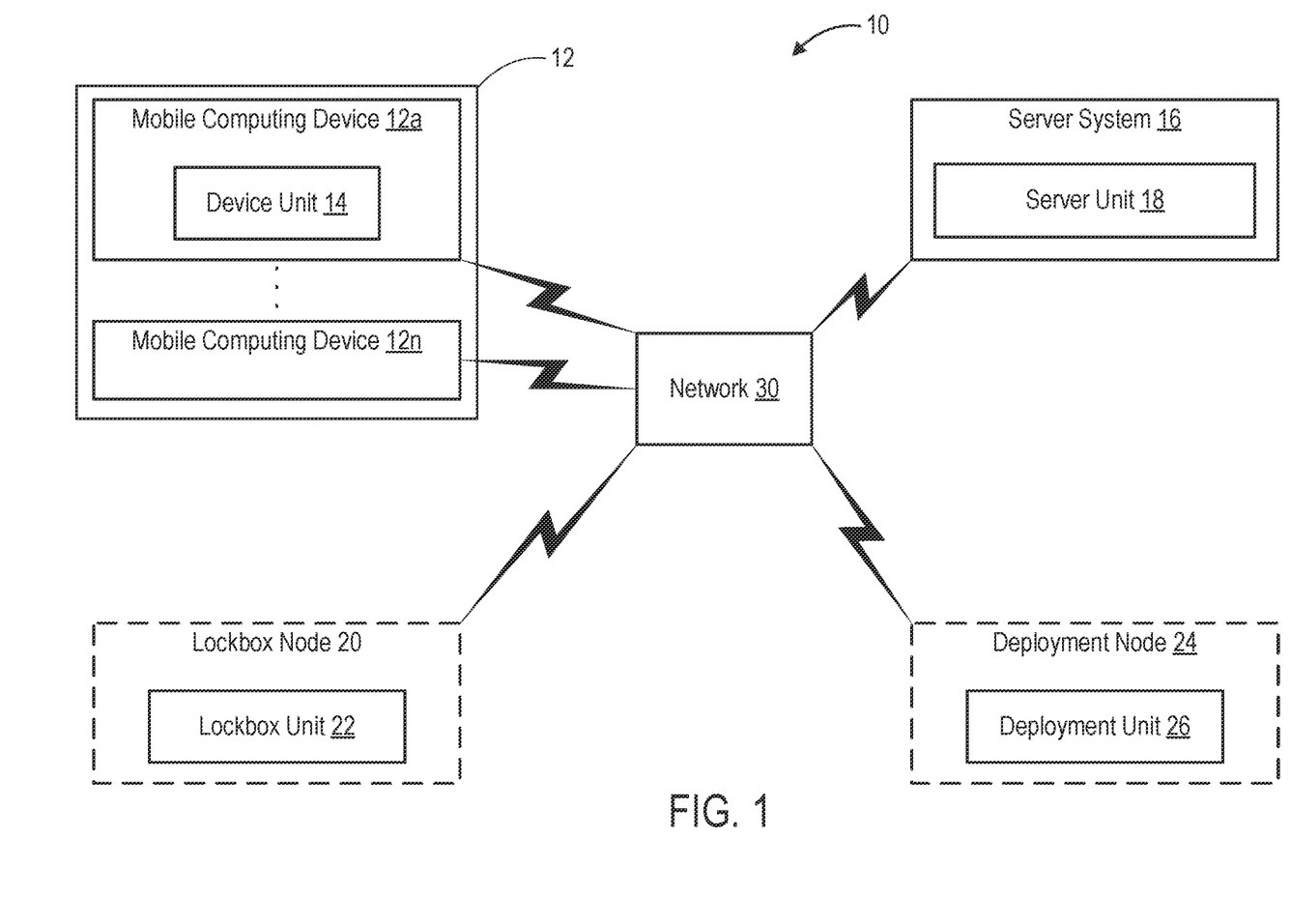
FIG. 1 is a schematic diagram of various mobile computing devices and components according to some embodiments of the present disclosure.

Referring now to the drawing figures, in which like elements are referred to by like reference numerals, there is shown in FIG. 1 is a schematic diagram of a system 10. System 10 may include a plurality of mobile computing devices 12 (e.g., comprising device unit 14), server system 16 (e.g., comprising sever unit 18), lockbox node 20 (e.g., comprising lockbox unit 22), and deployment node 24 (e.g., comprising deployment unit 26). Mobile computing device 12 may include one or more mobile computing devices 12a-12n (collectively, mobile computing devices 12). Similarly, server system 16 may include one or more server systems 16 (collectively, server system 16), lockbox node 20 may include one or more lockbox nodes 20 (collectively, lockbox nodes 20), and deployment node 24 may include one or more deployment node 24 (collectively, deployment nodes 24).

Mobile computing device 12 may be configured to perform one or more actions associated with an ML process such as train ML models, refine trained ML models, test ML models, label training data, etc. Server system 16 may be configured to receive, from one or more mobile computing devices 12, ML models and labels used to train the ML models. Server system 16 may be further configured to perform other actions such as grouping (and/or combining) ML models based on metadata (e.g., without providing the underlying training data (e.g., media, such as images, video, audio, etc.)). Lockbox node 20 may be configured to store and provide data (e.g., video data, alarm events, etc.). Further, deployment node 24 may be configured to receive grouped or combined ML models from server system 16 and perform one more actions using one or more actions using the grouped or combined ML models.

In one or more embodiments, any mobile computing device 12, server system 16, lockbox node 20, and deployment node 24 may be configured to communicate with each other via one or more communication links and protocols. Further, system 10 may include network 30, which may be configured to provide direct and/or indirect communication, e.g., wired and/or wireless communication, between any two or more components of system 10, e.g., mobile computing device 12, server system 16, lockbox node 20, and deployment node 24. Although network 30 is shown as an intermediate network between components or mobile computing devices of system 10, any component or mobile computing device may communicate directly with any other component or mobile computing device of system 10.

Figure 2:
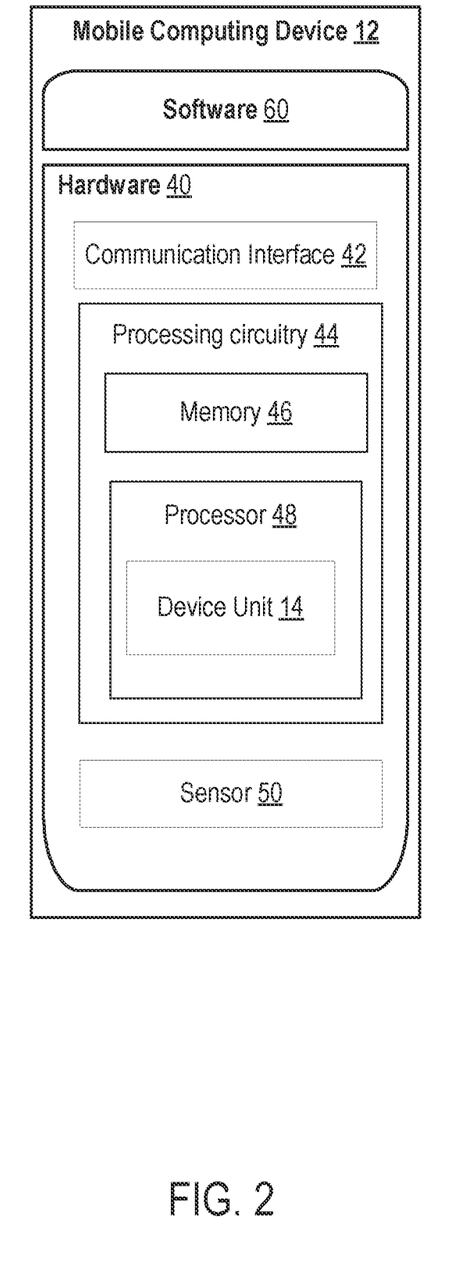
FIG. 2 is a block diagram of an example mobile computing device in the system of FIG. 1 according to some embodiments of the present disclosure.

FIG. 2 shows an example mobile computing device 12, which may comprise hardware 40, including communication interface 42 and processing circuitry 44. The processing circuitry 44 may include a memory 46 and a processor 48. In addition to, or instead of a processor, such as a central processing unit, and memory, the processing circuitry 44 may comprise integrated circuitry for processing and/or control, e.g., one or more processors, processor cores, field programmable gate arrays (FPGAs) and/or application specific integrated circuits (ASICs) adapted to execute instructions. The processor 48 may be configured to access (e.g., write to and/or read from) the memory 46, which may comprise any kind of volatile and/or nonvolatile memory, e.g., cache, buffer memory, random access memory (RAM), read-only memory (ROM), optical memory and/or erasable programmable read-only memory (EPROM).

Communication interface 42 may comprise and/or be configured to support communication between mobile computing device 12 and any other component of system 10. Communication interface 42 may include at least a radio interface configured to set up and maintain a wireless connection with network 30 and/or any component of system 10. The radio interface may be formed as, or may include, for example, one or more radio frequency, radio frequency (RF) transmitters, one or more RF receivers, and/or one or more RF transceivers. Communication interface 42 may include a wired communication interface, such as an Ethernet interface, configured to set up and maintain a wired connection with network 30 and/or any component of system 10. Further, hardware 40 may further comprise sensor 50 configured to sense, process, and store images, video, and video data (e.g., in memory 46).

Mobile computing device 12 may further include software 60 stored internally in, for example, memory 46 or stored in external memory (e.g., database, storage array, network storage mobile computing device, etc.) accessible by mobile computing device 12 via an external connection. The software 60 may be executable by the processing circuitry 44. The processing circuitry 44 may be configured to control any of the methods and/or processes described herein and/or to cause such methods, and/or processes to be performed, e.g., by mobile computing device 12. Processor 48 corresponds to one or more processors 48 for performing mobile computing device 12 functions described herein. The memory 46 is configured to store data, programmatic software code and/or other information described herein that may configure the processor 48 and/or other processing circuitry 44 to perform the actions described herein. In some embodiments, the software 60 may include instructions that, when executed by the processor 48 and/or processing circuitry 44, causes the processor 48 and/or processing circuitry 44 to perform the processes described herein with respect to mobile computing device 12. For example, processing circuitry 44 may include device unit 14 configured to perform one or more mobile computing device functions as described herein such as training and refining ML models using labels and causing transmission of the ML models and labels.

Figure 3:
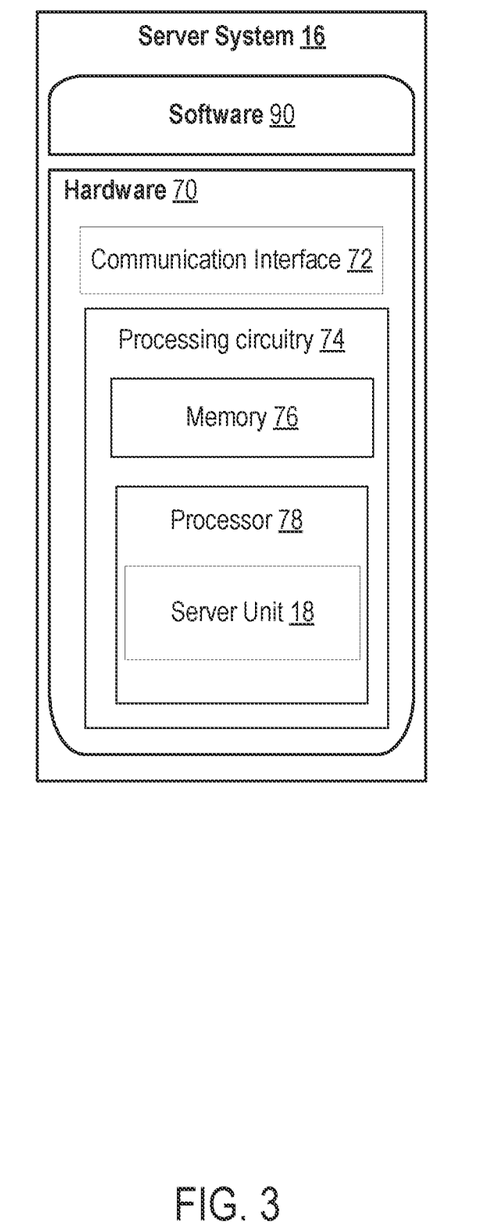
FIG. 3 is a block diagram of an example server system in the system of FIG. 1 according to some embodiments of the present disclosure.

FIG. 3 shows an example server system 16, which may comprise hardware 70, including communication interface 72 and processing circuitry 74. The processing circuitry 74 may include a memory 76 and a processor 78. In addition to, or instead of a processor, such as a central processing unit, and memory, the processing circuitry 44 may comprise integrated circuitry for processing and/or control, e.g., one or more processors, processor cores, FPGAs and/or ASICs adapted to execute instructions. The processor 78 may be configured to access (e.g., write to and/or read from) the memory 76, which may comprise any kind of volatile and/or nonvolatile memory, e.g., cache, buffer memory, RAM, ROM, optical memory and/or EPROM.

Communication interface 72 may comprise and/or be configured to support communication between server system 16 and any other component of system 10. Communication interface 72 may include at least a radio interface configured to set up and maintain a wireless connection with network 30 and/or any component of system 10. The radio interface may be formed as, or may include, for example, one or more radio frequency, RF transmitters, one or more RF receivers, and/or one or more RF transceivers. Communication interface 72 may include a wired communication interface, such as an Ethernet interface, configured to set up and maintain a wired connection with network 30 and/or any component of system 10.

Server system 16 may further include software 90 stored internally in, for example, memory 76 or stored in external memory (e.g., database, storage array, network storage device, etc.) accessible by server system 16 via an external connection. The software 90 may be executable by the processing circuitry 74. The processing circuitry 74 may be configured to control any of the methods and/or processes described herein and/or to cause such methods, and/or processes to be performed, e.g., by server system 16. Processor 78 corresponds to one or more processors 78 for performing server system 16 functions described herein. The memory 76 is configured to store data, programmatic software code and/or other information described herein. In some embodiments, the software 90 may include instructions that, when executed by the processor 78 and/or processing circuitry 74, causes the processor 48 and/or processing circuitry 74 to perform the processes described herein with respect to server system 16. For example, processing circuitry 74 may include server unit 18 configured to perform one or more server system 16 functions as described herein such as grouping and combining ML models received from a plurality of mobile computing devices 12.

Figure 4:
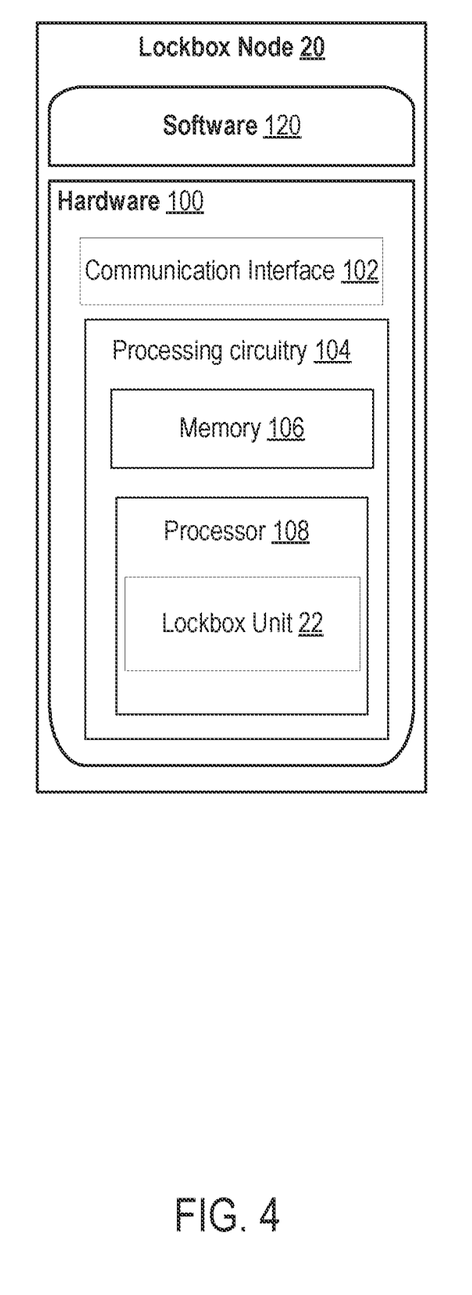
FIG. 4 is a block diagram of an example lockbox node in the system of FIG. 1 according to some embodiments of the present disclosure.

FIG. 4 shows an example lockbox node 20, which may comprise hardware 100, including communication interface 102 and processing circuitry 104. The processing circuitry 104 may include a memory 106 and a processor 108. In addition to, or instead of a processor, such as a central processing unit, and memory, the processing circuitry 104 may comprise integrated circuitry for processing and/or control, e.g., one or more processors and/or processor cores and/or FPGAs and/or ASICs adapted to execute instructions. The processor 108 may be configured to access (e.g., write to and/or read from) the memory 106, which may comprise any kind of volatile and/or nonvolatile memory, e.g., cache and/or buffer memory and/or RAM and/or ROM and/or optical memory and/or EPROM.

Communication interface 102 may comprise and/or be configured to support communication between lockbox node 20 and any other component of system 10. Communication interface 102 may include at least a radio interface configured to set up and maintain a wireless connection with network 30 and/or any component of system 10. The radio interface may be formed as, or may include, for example, one or more RF transmitters, one or more RF receivers, and/or one or more RF transceivers. Communication interface 102 may include a wired communication interface, such as an Ethernet interface, configured to set up and maintain a wired connection with network 30 and/or any component of system 10.

Lockbox node 20 may further include software 120 stored internally in, for example, memory 106 or stored in external memory (e.g., data store, database, storage array, network storage device, etc.) accessible by lockbox node 20 via an external connection. The software 120 may be executable by the processing circuitry 104. The processing circuitry 104 may be configured to control any of the methods and/or processes described herein and/or to cause such methods, and/or processes to be performed, e.g., by lockbox node 20. Processor 108 corresponds to one or more processors 108 for performing lockbox node 20 functions described herein. The memory 106 is configured to store data, programmatic software code and/or other information described herein. In some embodiments, the software 120 may include instructions that, when executed by the processor 108 and/or processing circuitry 104, causes the processor 108 and/or processing circuitry 104 to perform the processes described herein with respect to lockbox node 20. For example, processing circuitry 104 may include server unit 18 configured to perform one or more lockbox node functions as described herein such as performing one or more action using ML models grouped and combined by server system 16. In one or more embodiments, lockbox node 20 may be a data store configured to allow time-controlled access to data stored therein.

Figure 5:
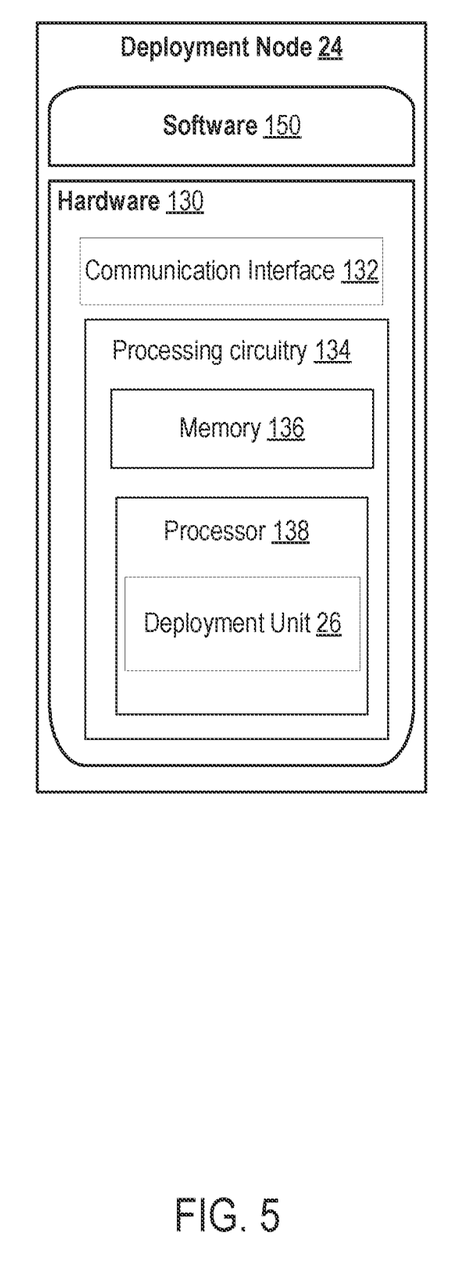
FIG. 5 is a block diagram of an example deployment node in the system of FIG. 1 according to some embodiments of the present disclosure.

FIG. 5 shows an example deployment node 24, which may comprise hardware 130, including communication interface 132 and processing circuitry 134. The processing circuitry 134 may include a memory 136 and a processor 138. In addition to, or instead of a processor, such as a central processing unit, and memory, the processing circuitry 104 may comprise integrated circuitry for processing and/or control, e.g., one or more processors and/or processor cores and/or FPGAs and/or ASICs adapted to execute instructions. The processor 138 may be configured to access (e.g., write to and/or read from) the memory 136, which may comprise any kind of volatile and/or nonvolatile memory, e.g., cache and/or buffer memory and/or RAM and/or ROM and/or optical memory and/or EPROM.

Communication interface 132 may comprise and/or be configured to support communication between deployment node 24 and any other component of system 10. Communication interface 132 may include at least a radio interface configured to set up and maintain a wireless connection with network 30 and/or any component of system 10. The radio interface may be formed as, or may include, for example, one or more RF transmitters, one or more RF receivers, and/or one or more RF transceivers. Communication interface 132 may include a wired communication interface, such as an Ethernet interface, configured to set up and maintain a wired connection with network 30 and/or any component of system 10.

Deployment node 24 may further include software 150 stored internally in, for example, memory 136 or stored in external memory (e.g., database, storage array, network storage device, etc.) accessible by deployment node 24 via an external connection. The software 150 may be executable by the processing circuitry 134. The processing circuitry 134 may be configured to control any of the methods and/or processes described herein and/or to cause such methods, and/or processes to be performed, e.g., by deployment node 24. Processor 138 corresponds to one or more processors 138 for performing deployment node 24 functions described herein. The memory 136 is configured to store data, programmatic software code and/or other information described herein. In some embodiments, the software 150 may include instructions that, when executed by the processor 108 and/or processing circuitry 134, causes the processor 138 and/or processing circuitry 134 to perform the processes described herein with respect to deployment node 24. For example, processing circuitry 134 may include deployment unit 26 configured to perform one or more deployment node functions as described herein such as performing one or more actions using ML models grouped and combined by server system 16.

Figure 6:
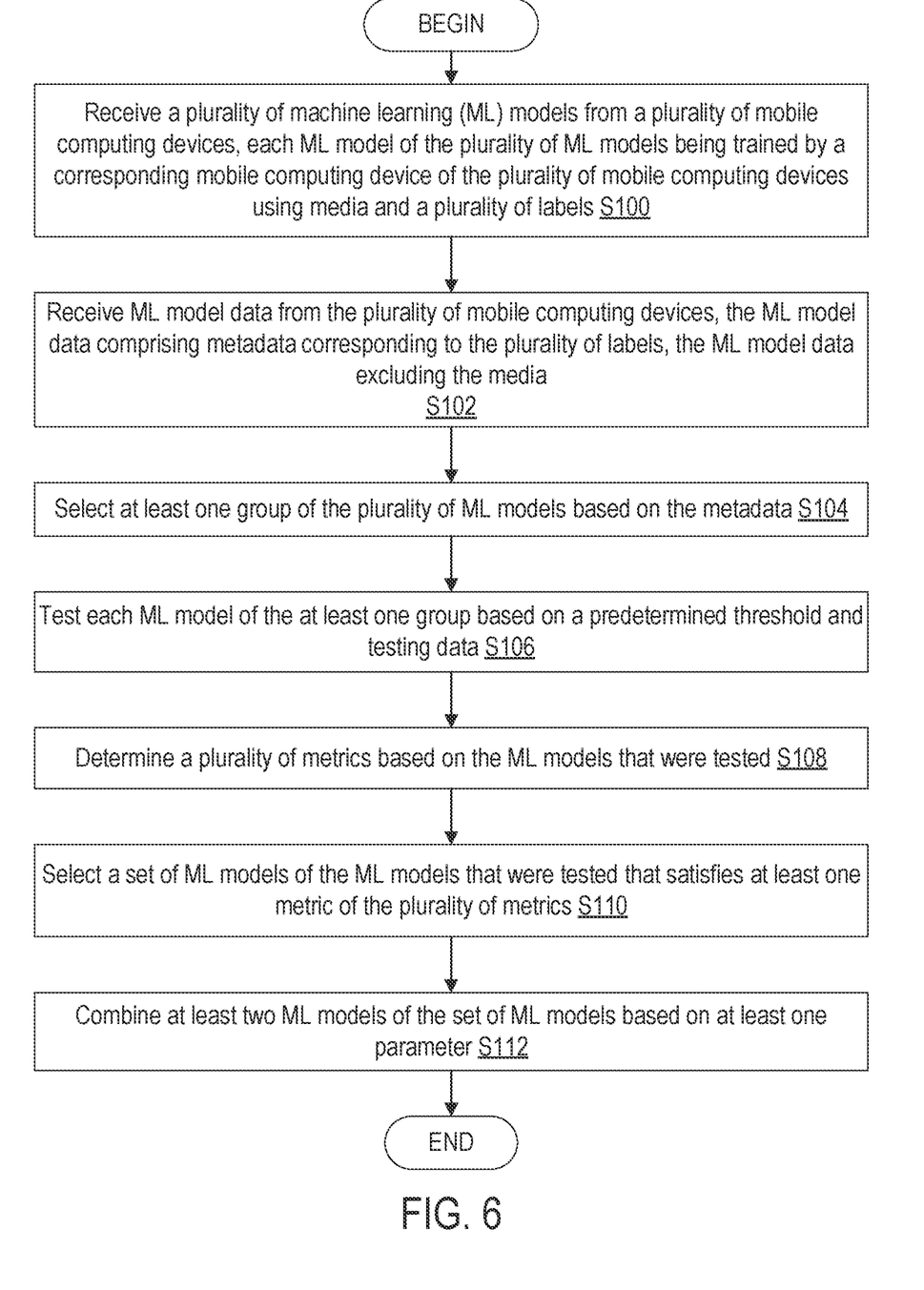
FIG. 6 is a flowchart of an example process performed in the server system of FIG. 3 according to some embodiments of the present disclosure.

FIG. 6 is a flowchart of an example process (i.e., method) implemented by server system 16 according to one or more embodiments of the present disclosure. One or more blocks described herein may be performed by one or more elements of server system 16 such as by one or more of communication interface 72, processing circuitry 74 (including the server unit 18), processor 78, memory 76, etc. Server system 16 is configured to receive (Block S100) a plurality of machine learning (ML) models 202 from a plurality of mobile computing devices 12, where each ML model 202 of the plurality of ML models 202 is trained by a corresponding mobile computing device 12 of the plurality of mobile computing devices 12 using media and a plurality of labels, and receive (Block S102) ML model data from the plurality of mobile computing devices 12, where the ML model data includes metadata corresponding to the plurality of labels, and the ML model data excludes the media. Server system 16 is further configured to select (Block S104) at least one group 206 of the plurality of ML models 202 based on the metadata, test (Block S106) each ML model 202 of the at least one group 206 based on a predetermined threshold and testing data, and determine (Block S108) a plurality of metrics based on the ML models 202 that were tested. In addition, server system 16 is configured to select (Block S110) a set of ML models 202 of the ML models 202 that were tested that satisfies at least one metric of the plurality of metrics and combine (Block S112) at least two ML models 202 of the set of ML models 202 based on at least one parameter.

In some embodiments, the method further includes selecting the at least one group 206 of the plurality of ML models 202 that have metadata indicating that the corresponding ones of the plurality of ML models 202 are configured to detect at least one specified object.

In some other embodiments, the method further includes combining at least two ML models 202 of the at least one group 206 of the plurality of ML models 202 based on at least one parameter to generate a combined ML model, the at least one parameter including at least one voting weight.

In some embodiments, the method further includes feeding input data to the combined ML model to perform object detection.

In some other embodiments, the method further includes testing each ML model 202 of the at least one group 206 of the plurality of ML models 202 using testing data to determine a plurality of metrics.

In some embodiments, the method further includes selecting for combining only ones of the plurality of ML models 202 that satisfy at least one metric of the plurality of metrics.

In some other embodiments, the method further includes receiving additional media from a lockbox environment that restricts access to a plurality of users based on time and inputting the additional media to the combined ML model to perform an object detection.

In some embodiments, the at least one action includes deploying the at least one group 206 of the plurality of ML models 202 to a deployment node 24, triggering the deployment node 24 to perform object detection using video data and the at least one group 206 of the plurality of ML models 202, or performing object detection using the video data and the at least one group 206 of the plurality of ML models 202.

Having described the general process flow of arrangements of the disclosure and having provided examples of hardware and software arrangements for implementing the processes and functions of the disclosure, the sections below provide details and examples of arrangements for making ML model inference(s) using user-created ML models while maintaining user privacy. Any of the functions described below may be performed by any of the components of system 10, including mobile computing device 12, server system 16, lockbox node 20, deployment node 24, etc. One or more mobile computing device 12 functions described below may be performed by one or more of processing circuitry 44, processor 48, device unit 14, etc. One or more server system 16 functions described below may be performed by one or more of processing circuitry 74, processor 78, server unit 18, etc. One or more lockbox node 20 functions described below may be performed by one or more of processing circuitry 104, processor 108, lockbox unit 22, etc. One or more lockbox node 20 functions described below may be performed by one or more of processing circuitry 134, processor 138, deployment unit 26, etc.

One or more embodiments provide a system 10 (e.g., server-side system) where a server system 16 collects ML models 202 that are trained or refined on mobile computing devices 12 (e.g., users' devices). In addition to collecting the ML models 202 (e.g., information regarding the tensors and weights that define the model), server system 16 collects corresponding metadata, such as information describing the labels used when training the ML model 202. In some other embodiments, the raw training media (e.g., the user's photos, videos, audio, etc.) is not collected.

In some embodiments, once server system 16 has obtained ML models 202 from several mobile computing devices 12, server system 16 can combine the ML models 202 in various ways. For example, if there are ten ML models 202 for detecting bicycles, the ten ML models 202 can be leveraged to provide a bicycle detection system that performs better than the ten ML models 202 individually. Additionally, by collecting the ML models 202 and metadata 204 without the actual training data, user privacy is maintained.

Figure 7:
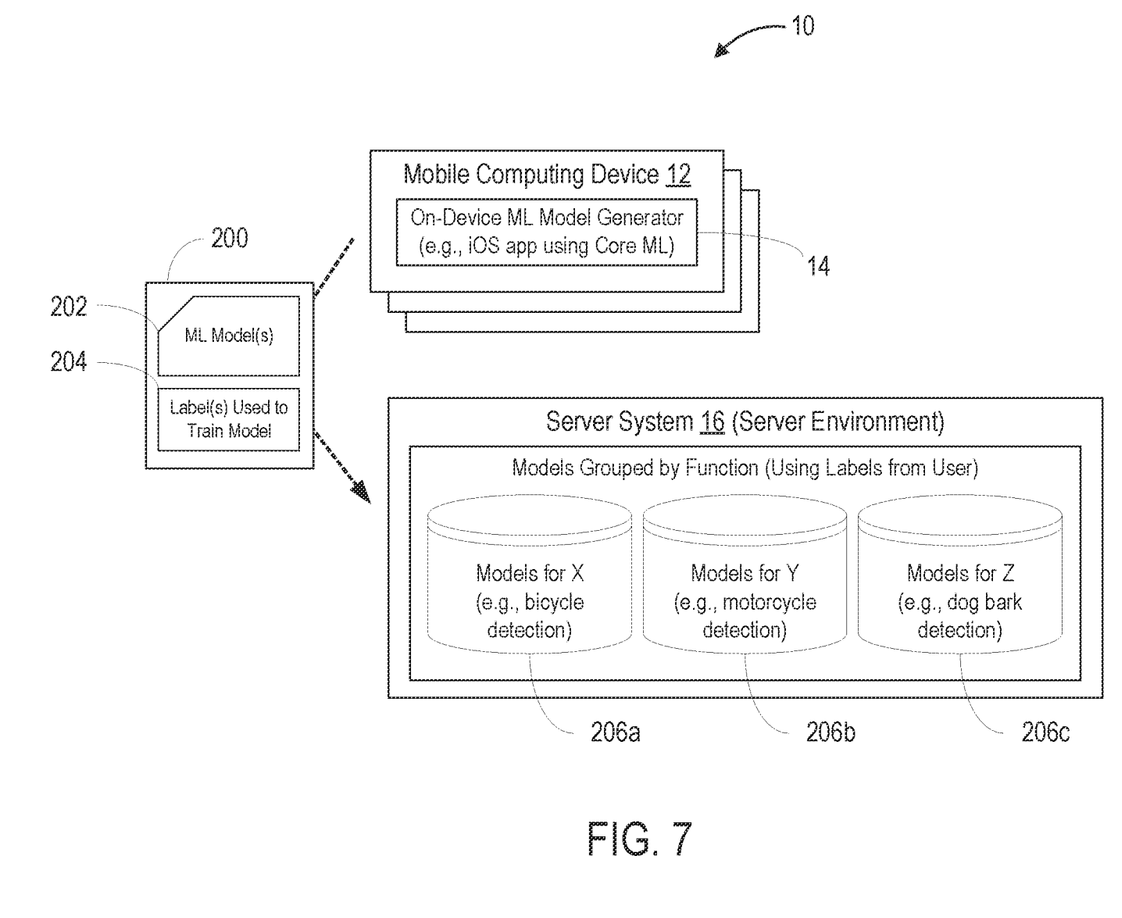
FIG. 7 shows an example implementation of the system according to some embodiments of the present disclosure.

FIG. 7 shows an example implementation according to one or more embodiments. System 10 may include a plurality of mobile computing devices 12 (e.g., smart phones) and server system 16. Users of mobile computing devices 12 may train (or refine already-trained) ML models on their mobile computing devices 12. The training process may involve the users labeling training data (e.g., photos, video, audio) and feeding the data and labels into an ML algorithm. The output of the algorithm may be the trained ML model. Information 200 (i.e., the trained ML model 202 and ML model data comprising metadata 204 describing the labels used to train the model) is transmitted to server system 16 (e.g., server environment). In some embodiments, the underlying training media (e.g., photos, video, audio) is not provided to server system 16. That is, the ML model data may exclude the training media or any type of media. In some other embodiments, the user of each corresponding mobile computing device 12 may be prompted to opt-in to provide the ML model 202 and metadata 204. The ML models 202 collected by server system 16 may be grouped (e.g., into groups 206a, 206b, 206c) based on the metadata 204. For example, ML models 202 that have metadata 204 indicating that the ML may be used to detect bicycles may be grouped together (e.g., in group 206a). ML models 202 that have metadata 204 indicating that the ML may be used to detect motorcycles may be grouped together (e.g., in group 206b). ML models 202 that have metadata 204 indicating that the ML may be used to detect dog bark detection may be grouped together (e.g., in group 206c).

Figure 8:
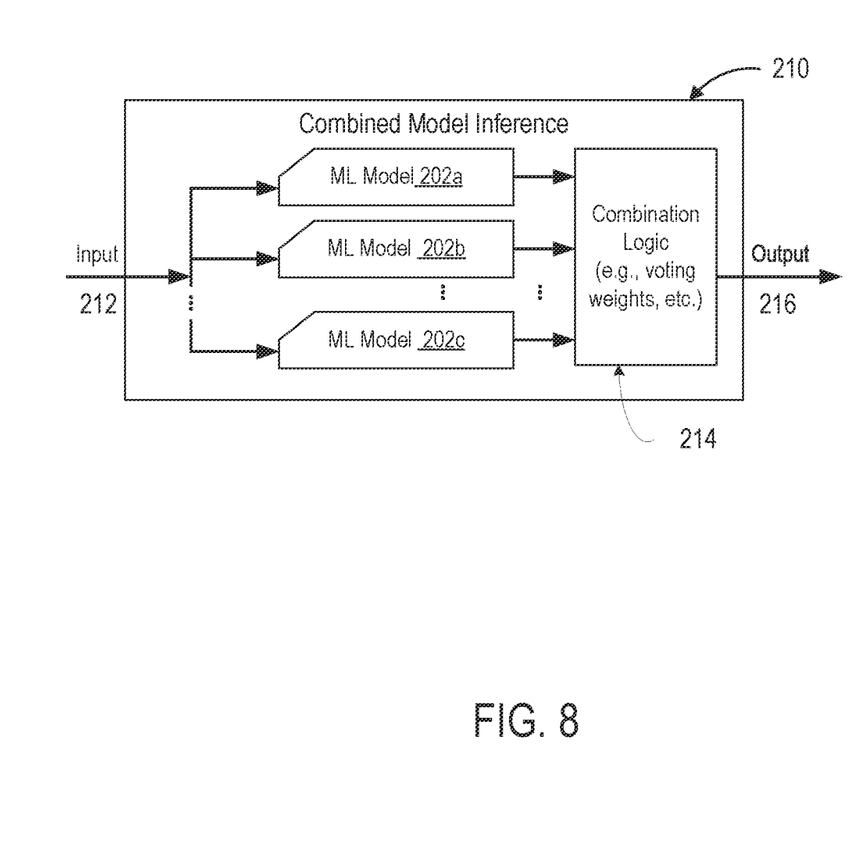
FIG. 8 shows an example combined model inference according to some embodiments of the present disclosure.

In some embodiments, ML models 202 that perform similar functionality (i.e., ML models 202 within a particular group 206) can be combined in various ways as illustrated in FIG. 8. A combined model inference 210 may be made such as by server unit 18. Input data 212 can be fed into multiple ML models 202 (e.g., ML models 202a, 202b, 202c) within a group 206, and the outputs of the individual ML models 202 used to generate an output 216 (e.g., output data). The combination logic 214 (e.g., performed by server unit 18) may include using voting weights.

In some other embodiments, only received ML models 202 that satisfies a predetermined testing criteria may be selected and/or used by server system 16. For example, server system 16 may test ML models received from users and use only the ML models 202 that perform above a predefined threshold. For example, once an ML model 202 is received from a mobile computing device 12, the ML model can be tested using pre-existing testing data (e.g., stock photos, video, or audio) to determine various metrics, such as true positive rate, true negative rate, false positive rate, false negative rate, etc. If an ML model 202 satisfies one or more predefined metrics, the ML model 202 can be incorporated.

In some embodiments, the combined model inference 210 may be used in conjunction with a lockbox node 20. Lockbox node 20 may be configured to store video data and other data associated with an alarm event in a secured environment (e.g., memory 76). Lockbox node 20 may be further configured to provide temporary access to the video data and other data to users (e.g., predetermined users, agents of a security monitoring company, and/or first responders). More specifically, the combined model inference 210 (and/or groups 206 and/or ML models 202) may be automatically applied to video stored in the lockbox node 20. For example, the combined model inference 210 may be executed to determine whether an event such as broken glass, a firearm, a gunshot, etc. are detected in the video. If such objects or events are detected, the corresponding video and timestamp within the video can be automatically flagged and surfaced for the predetermined users to access.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and/or acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The present invention is not limited to what has been particularly shown and described herein above. In addition, unless mention was made above to the contrary, all of the accompanying drawings are not to scale. A variety of modifications and variations are possible in light of the above teachings without departing from the scope and spirit of the disclosure.

What is claimed is:

1. A server system, comprising:
   at least one processor; and
   at least one memory storing a plurality of instructions that, when executed by the at least one processor, causes the at least one processor to:
   receive a plurality of machine learning (ML) models from a plurality of mobile computing devices, each ML model of the plurality of ML models being trained by a corresponding mobile computing device of the plurality of mobile computing devices using media and a plurality of labels;
   receive ML model data from the plurality of mobile computing devices, the ML model data comprising metadata corresponding to the plurality of labels, the ML model data excluding the media;
   select at least one group of the plurality of ML models based on the metadata;
   test each ML model of the at least one group based on a predetermined threshold and testing data;
   determine a plurality of metrics based on the ML models that were tested;
   select a set of ML models of the ML models that were tested that satisfies at least one metric of the plurality of metrics;
   combine at least two ML models of the set of ML models based on at least one parameter;
   receive additional media from a lockbox environment that restricts access to a plurality of users based on time; and
   input the additional media to the combined at least two ML models to perform an object detection.

2. A server system, comprising:
   at least one processor; and
   at least one memory storing a plurality of instructions that, when executed by the at least one processor, causes the at least one processor to:
   receive a plurality of machine learning (ML) models from a plurality of mobile computing devices, each ML model of the plurality of ML models being trained by a corresponding mobile computing device of the plurality of mobile computing devices;
   receive metadata from the plurality of mobile computing devices corresponding to information used by the plurality of mobile computing devices to train the ML models;
   select at least one group of the plurality of ML models based on the metadata;
   perform at least one action based on the at least one group of the plurality of ML models;
   receive additional media from a lockbox environment that restricts access to a plurality of users based on time; and
   input the additional media to a combined ML model to perform an object detection.

3. The server system of claim 2, wherein the plurality of instructions further cause the at least one processor to select the at least one group of the plurality of ML models that have metadata indicating that corresponding ones of the plurality of ML models are configured to detect at least one specified object.

4. The server system of claim 2, wherein the plurality of instructions are further configured to cause the at least one processor to combine at least two ML models of the at least one group of the plurality of ML models based on at least one parameter to generate the combined ML model.

5. The server system of claim 4, wherein the at least one parameter includes at least one voting weight.

6. The server system of claim 4, wherein the plurality of instructions are further configured to cause the at least one processor to feed input data to the combined ML model to perform the object detection.

7. The server system of claim 4, wherein the plurality of instructions are further configured to cause the at least one processor to test each ML model of the at least one group of the plurality of ML models based on a predetermined threshold.

8. The server system of claim 7, wherein the plurality of instructions are further configured to cause the at least one processor to test each ML model of the at least one group of the plurality of ML models using testing data to determine a plurality of metrics.

9. The server system of claim 8, wherein the plurality of instructions are further configured to cause the at least one processor to select for combining only ones of the plurality of ML models that satisfy at least one metric of the plurality of metrics.

10. The server system of claim 2, wherein the at least one action comprises:
deploying the at least one group of the plurality of ML models to a deployment node;
triggering the deployment node to perform the object detection using video data and the at least one group of the plurality of ML models; or
performing the object detection using the video data and the at least one group of the plurality of ML models.

11. A method implemented in a server system, the method comprising:
receiving a plurality of machine learning (ML) models from a plurality of mobile computing devices, each ML model of the plurality of ML models being trained by a corresponding mobile computing device of the plurality of mobile computing devices;
receiving metadata from the plurality of mobile computing devices corresponding to information used by the plurality of mobile computing devices to train the ML models;
selecting at least one group of the plurality of ML models based on the metadata;
performing at least one action based on the at least one group of the plurality of ML models;
receiving additional media from a lockbox environment that restricts access to a plurality of users based on time; and
inputting the additional media to a combined ML model to perform an object detection.

12. The method of claim 11, further comprising selecting the at least one group of the plurality of ML models that have metadata indicating that corresponding ones of the plurality of ML models are configured to detect at least one specified object.

13. The method of claim 11, further comprising combining at least two ML models of the at least one group of the plurality of ML models based on at least one parameter to generate the combined ML model, the at least one parameter including at least one voting weight.

14. The method of claim 13, further comprising feeding input data to the combined ML model to perform the object detection.

15. The method of claim 13, further comprising testing each ML model of the at least one group of the plurality of ML models based on a predetermined threshold.

16. The method of claim 15, further comprising testing each ML model of the at least one group of the plurality of ML models using testing data to determine a plurality of metrics.

17. The method of claim 16, further comprising selecting for combining only ones of the plurality of ML models that satisfy at least one metric of the plurality of metrics.

18. The method of claim 11, wherein the at least one action comprises:
deploying the at least one group of the plurality of ML models to a deployment node;
triggering the deployment node to perform the object detection using video data and the at least one group of the plurality of ML models; or
performing the object detection using the video data and the at least one group of the plurality of ML models.

* * * * *